June 7, 1932.   V. L. MARTIN   1,861,638
BRAKE ADJUSTING GAUGE
Filed Dec. 22, 1930

INVENTOR.
Verner L. Martin.
BY Lancaster, Allwine and Rommel
ATTORNEYS.

Patented June 7, 1932

1,861,638

UNITED STATES PATENT OFFICE

VERNER L. MARTIN, OF MOUNT HOPE, WEST VIRGINIA

BRAKE ADJUSTING GAUGE

Application filed December 22, 1930. Serial No. 504,144.

The present invention relates to brake testing devices and more particularly to devices provided for ascertaining the braking power of the brakes with which motor vehicles are equipped.

With the object in view of providing equipment whereby the brakes of motor vehicles may be accurately adjusted to exert an even braking action on both rear wheels simultaneously and, where the vehicle is equipped with four wheel brakes, both front wheels simultaneously, but to act after the brakes of the rear wheels have been applied, there have been provided machines upon which the vehicle may be run and, by electric motors serving as prime movers to rotate the wheels, the braking action at each wheel may be determined and adjustment made accordingly. This equipment is however, expensive and necessitates driving of the vehicle to the equipment so that often the brakes are neglected with subsequent wear and tear on tires the resulting hazards incident to faulty brakes. There are brake testing devices which are provided for direct association with the wheels for ascertaining their braking power, but they are rather cumbersome and must be adjusted to the particular wheel, that is, either left or right wheel, thus taking time to apply.

The principal object of the present invention is to provide a brake testing device which is inexpensive, but efficient, and may be carried in the door pocket of a motor vehicle, in a tool kit, or hung upon the walls of a garage.

Another object is to provide a brake testing device which is easily applied for testing purposes, requires no complicated operation when testing brakes, and does not mar the tire, wheels or vehicle body.

Another object is to provide a brake testing device equipped with an independently movable indicator which may be set to correspond with the reading of the gauge indicator and thus serve as a reference for future adjustment.

A still further object is found in the provision of a device which, while primarily used as a brake testing device, may be so applied as to detect wheels out of true due to worn bearings and bent axles.

Other objects and advantages of the invention will appear in the following detailed description, taken in connection with the accompanying drawing, forming a part of this specification and in which drawing.

Figure 1:
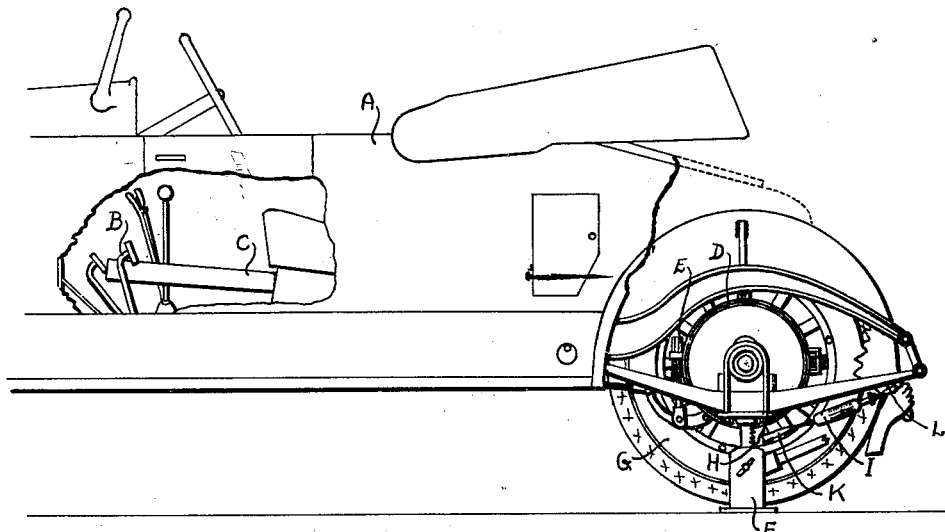
Figure 1 is a fragmentary side elevation of a motor vehicle body, with the brake testing device applied, parts of the body being broken away in order to more clearly disclose the application of the device.
Figure 2:
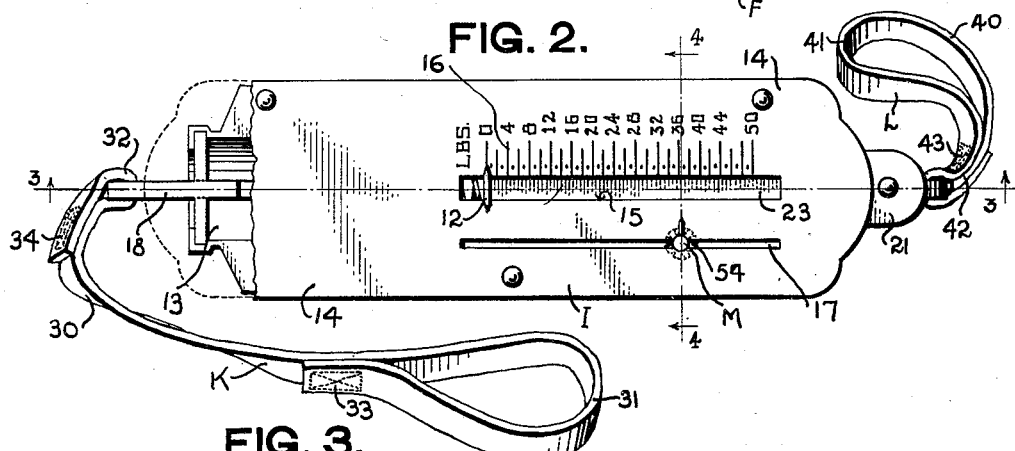
Figure 2 is a plan of the brake testing device, a part of the gauge of the device being broken away in order to more clearly illustrate a part of its construction.
Figure 3:
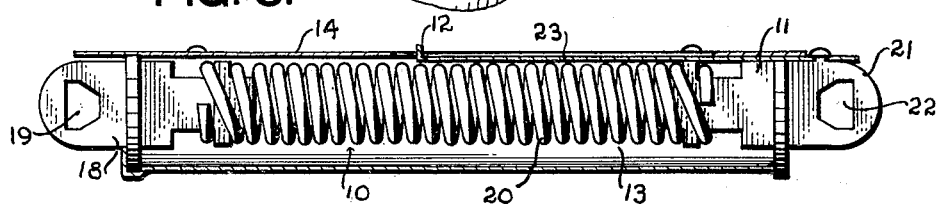
Figure 3 is a sectional view taken on the line 3—3 of Figure 2 showing in elevation, the interior construction of the gauge.
Figure 4:
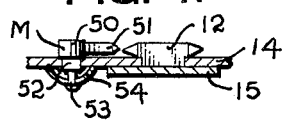
Figure 4 is a sectional view taken on the line 4—4 of Figure 2 showing in elevation the independently movable indicator associated with the gauge.

In the drawing, wherein like characters designate like parts, A is a motor vehicle, B the foot brake lever of the motor vehicle, C means for depressing the foot brake lever, D a brake band of the motor vehicle, E a brake band adjustment nut, F a jack for elevating the motor vehicle, G a wheel of the motor vehicle, H a projection on the wheel, I the gauge portion of the brake testing device, K an element secured to the gauge for attaching to the projection on the wheel, L a pull element carried by the gauge to assist in operating the gauge mechanism and M an independently movable indicator carried by the gauge.

The gauge portion I preferably includes a main body portion 10, a movable portion 11 and an indicator 12. The main body portion may comprise an elongated barrel 13, a cover plate 14 provided with an elongated longitudinal slot or way 15, with graduations 16 on the outer surface adjacent the slot 15, a preferably narrower slot or way 17 paralleling the slot 15, and a tensioning device retaining plate 18 having an eye 19. The movable portion 11 comprises a tensioning device, such as a coil spring 20, one end of which is attached to the plate 18 and the other end attached to a tensioning device retracting plate 21 having an eye 22. To this plate 21 is attached a rod 23 carrying the indicator 12 which latter projects thru the slot 15. The gauge I may be made of metal, the parts being preferably strong enough to withstand a strain of at least fifty pounds. Graduations 16 on the cover plate 14 may be in pounds and it is suggested that these graduations be numbered from 0 to 50 pounds, altho a higher or lower maximum may be used. The element K preferably comprises a relatively long flexible band-like strap or body 30 looped or turned upon itself as at 31 and 32, the ends of the loops or turns being sewn or otherwise secured as at 33 and 34. While the loop portion 31 is relatively long enough to easily encircle a rim bolt, valve stem or the like, of a motor vehicle wheel, the loop portion 32 is provided simply to be looped thru the eye 19, thus securing the element K to the main body portion 10 of the gauge I. Since leather is flexible and soft but strong, its use is suggested in the provision of the body 30.

The element L may be a relatively short flexible band-like strap or body 40 looped as at 41 and turned upon itself as at 42, the ends of the strap 40 being sewn or otherwise secured as at 43, after one end of the strap 40 is passed thru the eye 22. The ends of the strap are preferably positioned adjacent the eye so that there will be no ends or projections along the loop portion 41. While this body 40 may be of leather, like that of the body 30, it may also be of metal or the like and need not be flexible nor elongated. It is provided primarily so that the thumb or finger of the operator's hand may be extended thru the loop, and a leather loop would be less apt to bite into the operator's hand when tensioning the device than would metal. However, a rod or a short bar may be passed thru the loop to aid in tensioning the device and in such case a leather loop would not be necessary.

As to the indicator M it comprises a body or finger grip 50 carrying a pointer 51 both being above the upper surface of the cover plate 14, while a preferably squared reduced portion 52 of the indicator is positioned beneath the body 50 and adapted to slide within the slot 17. Attached to this portion 52 by a rivet 53 or otherwise, is a spring washer 54 which engages the under surface of the cover plate 14. This is provided to retain the indicator M in such positions along the slot 17 as it may be moved by the hand or otherwise. The indicator M may be made of metal or other material and may or may not be a regular part of the brake testing device.

In practice, in order to test the brakes of a motor vehicle, using applicant's device, the foot brake lever B is depressed about one-half way to the floor of the vehicle, and secured in this position in any suitable manner as, for instance, propping it by placing a block of wood C between the pedal and the front seat support as shown in Figure 1 of applicant's drawing. A wheel, for instance the rear right wheel G is then jacked up and the loop 31 of the element K of the brake testing device is placed over a projection on the wheel as, for instance, a rim bolt, or as shown in Figure 1, over the end of the valve stem. The thumb or finger of the operator may then be placed within the loop of the element L and the remaining fingers grasp the end of the fender or mud guard, as clearly shown in Figure 1. By moving the finger or thumb within the loop away from the device, the pull on the device will move the indicator 12 along the graduations until the pull overcomes the braking action on the wheel and the wheel will then revolve. The operator who may use the device while under the car can readily note the pull required to revolve the wheel, since the graduations are so positioned on the cover plate with respect to the elements K and L that the same are never upside down when the device is in use and the flexible element K is easily turnable so that the face of the device may be right in front of the operator. Since four or more adjustments of the brake adjusting nut are sometimes necessary and in order to get the proper braking adjustment, it can be seen that, because the device may be used while the operator is lying under the motor vehicle, and on the inside of the wheel to the right or left, unlimited adjustment of the brake adjusting nut and manipulation of the device can take place without the operator getting from under the vehicle. When a proper adjustment is secured the operator may note the pounds pull required to rotate the wheel and slide the indicator M to the point indicated on the graduations. He will then repeat the operation on the left rear wheel until he secures the same brake adjustment as on the rear right wheel. If the motor vehicle is equipped with four wheel brakes, he will move to the front wheels and adjust their brakes in the same way but, knowing the pull required by the rear wheels to revolve them, he can adjust the front wheel brakes to withstand a slightly less pull, the indicator 12 registering a few pounds less pull than that shown by the indicator M which has been adjusted to indicate the proper pull upon the rear wheels. If then, the indicator M remains in its position, at a future date the operator will be able to ascertain the proper pull for a future adjustment of the brakes. A ring, in place of the element L may be substituted thru which a rod or the like may be inserted and a leverage action secured.

It should be noted that the device may be used as a device for detecting bent axles or worn bearings of motor vehicle wheels, since the element K may be looped over each rim bolt in turn and the various pulls read, differences in pulls on various rim bolts indicating bearings or axles not functioning properly. Changes in detail may be made without departing from the spirit or scope of the following claims.

I claim:

1. A brake testing device comprising a gauge including a main body portion, a movable portion and an indicator operable by relative movement of the two said portions, a strap-like flexible element secured to one of said portions, said flexible element provided at its free end with a loop, and a pull element secured to the other of said portions.

2. A brake testing device comprising a gauge, including a main body portion, a movable portion and an indicator operable by relative movement of the said portions, a band-like flexible element, provided with a loop, secured to one of said portions, and a band-like element secured to the other of said portions.

3. A brake testing device comprising a gauge, including a main body portion, a movable portion and an indicator operable by relative movement of said portions, a relatively long flexible looped element secured to one of said portions, and a relatively short looped element secured to the other of said portions.

4. In a brake testing device a gauge provided with a movable indicator, means for positioning said gauge for testing a brake, and an independently movable indicator carried by said gauge and positioned out of the path of registering movement of said first mentioned indicator for indicating readings of said gauge.

5. In a brake testing device a gauge provided with brake testing means, and an independently movable indicator carried by said gauge and positioned out of the path of movement of all parts of said gauge, for indicating reading of said gauge.

VERNER L. MARTIN.